United States Patent Office 2,805,261
Patented Sept. 3, 1957

2,805,261
PRODUCTION OF ALHOHOLS AND ETHERS

Carl D. Keith, Munster, Ind., assignor to Sinclair Refining Company, New York, N. Y., a corporation of Maine No Drawing. Application June 10, 1955,
Serial No. 514,739

4 Claims. (Cl. 260—614)

This invention relates to the hydration of mono-olefins and to the conversion of alcohols to ethers. More particularly, this invention employs certain catalytic materials in the hydration of $C_2$ to $C_4$ mono-olefins to obtain the oxygen-containing products, alcohols, ethers or their mixtures; and in the conversion of $C_2$ to $C_4$ alcohols to obtain ethers either through alcohol dehydration or condensation of alcohol and mono-olefins. Specifically, the catalysts employed in the reactions of the present invention are sulfonated asphaltenes.

It is known that low molecular weight mono-olefins can be converted to the corresponding alcohols and ethers by contact with water in the presence of various catalytic materials. The reaction products, which may contain predominantly alcohol or ether and usually at least a small proportion of each as well as various amounts of olefin polymer, are particularly useful as gasoline blending agents to obtain fuels or higher octane rating. In this reaction olefins are in part hydrated to alcohols which may in turn at least in part be dehydrated to ethers or combined with olefin feed to form ethers but over all it can be considered that this is a hydration reaction. It is also known that low molecular weight alcohols can be dehydrated to obtain ethers. The water released in this reaction can combine with olefin if present to form alcohols. Should olefin be present in the latter reaction it could also form ether by condensation with alcohol. As an over-all process the olefin feeds are hydrated by contact with water over the catalytic material to obtain ether, alcohol or their mixtures, and after separation of any excess water the amount of ether produced in the alcohol or the mixed products can be increased by conversion over similar type catalysts.

Common source of olefin feed for these reactions are the relatively pure olefin materials and mixed streams such as the petroleum refinery streams containing propylene and butylenes, both normal and isobutylene, and a substantial amount of $C_3$ or $C_4$ paraffins. A particular stream which can be employed contains from about 50 to 75 volume percent of propylene with the remaining being substantially propane. In the hydration and alcohol conversion reactions, various solid catalysts are known to be effective and can be disposed in a fixed bed or employed in slurry form either on a batch or a continuous basis. In this reaction the water and olefin can be present as liquids or vapors depending upon the particular reaction conditions employed. A principal utility for the products of these reactions is as a gasoline blending component.

The present invention is concerned with these reactions in which sulfonated asphaltene catalysts are particularly effective. These catalysts are employed in the reaction in the solid form either as a fixed bed or slurried with the reactants. As the lower molecular weight sulfonated asphaltenes are soluble for the most part in benzene and in certain other solvents, such solutions of the sulfonated asphaltenes can be employed as liquid catalysts in homogeneous type reactions. Asphaltenes are high molecular weight, pentane-insoluble petroleum residues derived from asphaltic stocks such as Mid-Continent and naphthentic crudes. As an example of the production of asphaltenes a Mid-Continent asphalt derived as vacuum still bottoms is contacted with pentane to produce a low solubility fraction with the separation of 18 weight percent of oil. The insoluble fraction contains about 86.4% carbon, has an API gravity of 5.8, and a viscosity at 210° F. of 1815 SFS. This insoluble material is extracted with 10 parts of pentane per part of solids to obtain a more complete oil separation and the yield is 16% asphaltene based on the solids extracted. The asphaltene separated has a softening point of about 350° F. By varying the ratio of pentane in the extraction steps and the length and intimacy of contact diverse amounts of $C_5$-insoluble material can be obtained. As the number of extractions is increased or as larger amounts of pentane are employed additional amounts of oil are separated from the asphaltenes and the resulting pentane-insoluble material has an increased softening point; for instance, softening points up to 550° F. are not uncommon.

The asphaltenes can also be produced as insolubles in the extraction of asphalts with hexane which allows the production of purer asphaltene fractions, e. g. containing less soluble material, at reduced solvent to asphalt ratios, compared with that necessary when using pentane. In the present invention the asphaltenes of any desired purity or softening point, and most usually of softening points from about 350 to 550° F., are sulfonated to obtain a hydrogen ion exchange material which is relatively inexpensive and has properties which make it eminently suitable for the hydration of olefins and the conversion of alcohols to produce alcohols-ether mixtures according to the present invention.

In the hydration of the low molecular weight mono-olefins and the conversion of $C_2$ to $C_4$ alcohols it is known that the selection of reaction conditions controls the relative amounts of ether and alcohol in the reaction products. When employing the catalysts of the present invention the reaction temperatures for the hydration of the $C_2$ to $C_4$ mono-olefins will generally vary between about 50 to 175° C. with the reaction pressure being within the range from about 15 to 3000 p. s. i. g. or more. In the conversion of the $C_2$ to $C_4$ alcohols to ethers similar reaction temperatures are employed; however, the pressure varies from about atmospheric to 1500 p. s. i. g. or more. In this reaction the higher temperatures are preferred and when no olefin is present to react with water released in forming ether from alcohol, pressures as low as atmospheric are employed. However, when such olefin is present higher pressures generally produce a greater conversion of any olefin present. In both the hydration and alcohol conversion reactions space velocities of about .1 to 5 W. H. S. V. (weight of olefin per weight of catalyst per hour) are generally employed. In any event the catalyst is present in an amount sufficient to exhibit a substantial catalytic effect.

The reaction condition which has the most effect upon the distribution of ether and alcohol in the product of the mono-olefin hydration reaction is the water to olefin ratio. For increased alcohol formation the molar ratio of water to olefin is at least 1 to 1 with increased amounts of water assuring a larger formation of alcohol. When ether formation is to be increased the molar ratio of water to olefin is decreased and in particular is less than 0.5 to 1 and may be as low as 0.1 to 1 or less. In the alcohol conversion reaction ether formation can be increased by maintaining an alcohol to olefin molar ratio of at least 1 to 1, of course there need be no olefin present in the reaction.

As an example of the preparation of a sulfonated asphaltene, 1500 grams of asphaltenes (softening point 350° F.) are ground to 8 to 14 mesh and placed in a glass vessel. 5000 mls. of 98% sulfuric acid are added to the vessel and the mixture is heated for 16 hours at an average temperature of 250° F. After this time the reaction is cooled and the sulfuric acid filtered off. The filtrate is slightly colored. The sulfonated asphaltene is transferred to a glass tower and washed by percolation with deionized water until the effluent gives a negative sulfate test with barium chloride. The sulfonated particles appears as lamellar structures under the microscope. The resin particles are dried at 110° C.

This sulfonated asphaltene is effective in promoting the hydration and alcohol conversion reactions of the present invention. For instance, 50 grams of the sulfonated product are placed in a tubular downflow reactor surrounded by a radiant heat furnace. To the reactor is passed a $C_3$ petroleum refinery stream containing about 75 weight percent propylene with the remaining being substantially propane at the rate of about 50 grams per hour, and water at the rate of 15 grams per hour is combined with the refinery gas stream passing to the reactor. The hydration reaction temperature is maintained at 300° F. and a pressure of 1000 p. s. i. g. The effluent stream from the reactor includes isopropyl alcohol, isopropyl ether, unreacted olefin, propane and excess water. Similarly, the sulfonated asphaltene is employed in the conversion of isopropyl alcohol to isopropyl ether. In this system a mixture of propylene isopropyl alcohol and isopropyl ether is passed to the reactor at a temperature of 300° F. and 100 p. s. i. g. and the effluent product is substantially increased in ether content as compared with the feed to the reactor.

It is claimed:

1. The method of converting mono-olefin containing 2 to 4 carbons atoms to alcohols and ethers which comprises hydrating olefin with water while in contact with a catalytic amount of sulfonated asphaltene.

2. The method of claim 1 in which the olefin is propylene.

3. The method of producing ether from alcohol containing 2 to 4 carbon atoms which comprises converting alcohol while in contact with a catalytic amount of sulfonated asphaltene.

4. The method of claim 3 in which the alcohol is isopropyl alcohol.

References Cited in the file of this patent

UNITED STATES PATENTS

| | | |
|---|---|---|
| 2,036,317 | Bent et al. | Apr. 7, 1936 |
| 2,477,380 | Kreps et al. | July 26, 1949 |
| 2,480,940 | Leum et al. | Sept. 6, 1949 |

OTHER REFERENCES

Sussman: Ind. and Eng. Chemistry, vol. 38, pp. 1228–30 (1946).

Sperling: Ind. and Eng. Chemistry, vol. 40, pp. 890–1 (1948).